June 23, 1942.  N. J. POUX  2,287,324
SLIDE FASTENER MANUFACTURE
Original Filed Dec. 29, 1937
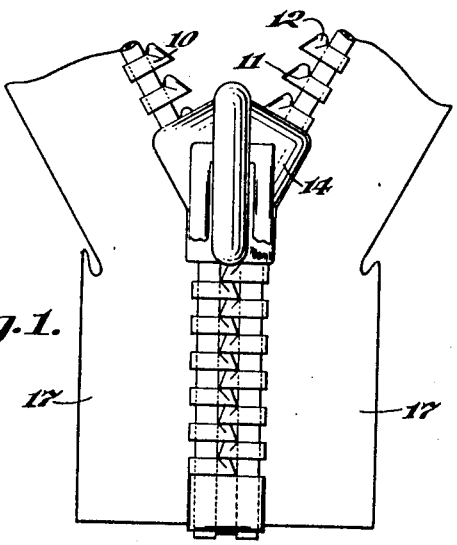
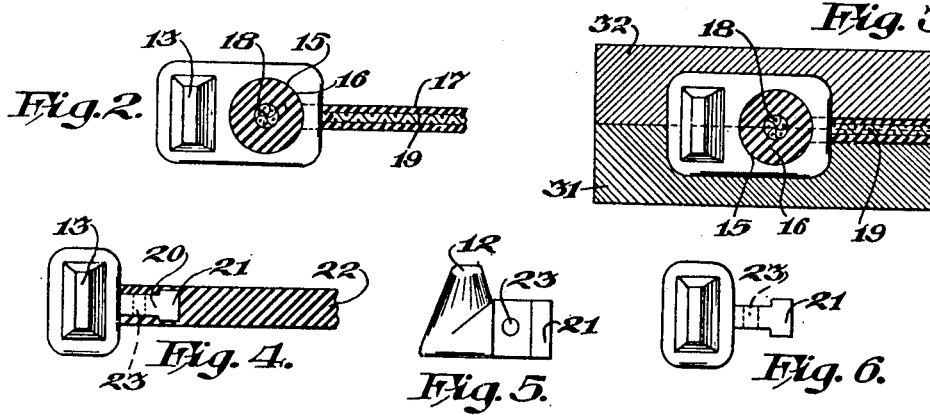
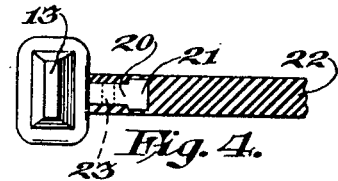
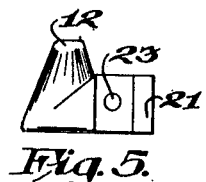
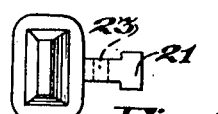
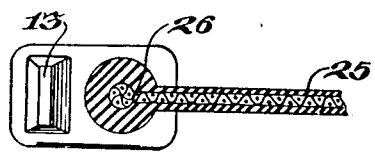
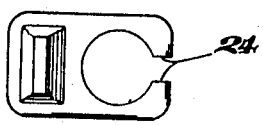
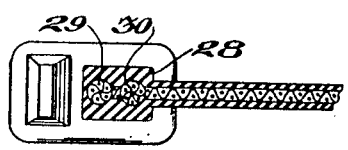
INVENTOR.
*Noel J. Poux*
BY *R. J. Kelley.*
ATTORNEY.

Patented June 23, 1942

2,287,324

UNITED STATES PATENT OFFICE 2,287,324

SLIDE FASTENER MANUFACTURE

Noel J. Poux, Meadville, Pa., assignor to Talon, Inc., a corporation of Pennsylvania Original application December 29, 1937, Serial No. 182,292. Divided and this application June 22, 1940, Serial No. 341,857

5 Claims. (Cl. 18—59)

My invention relates to flexible fasteners and methods of making the same. More particularly my invention provides a new fastener construction and the manufacture of such fasteners which are commonly called "zippers."

This application is a division of my application Serial No. 182,292, filed December 29, 1937, for Fasteners.

In the manufacture of slide fasteners, it is customary to make the slide fastener members with spread apart jaws and then bend them around the edge of a beaded fabric stringer in the case of metal elements, or stick them in position by solvent, in the case of soluble plastic material. Another method which is used to some extent is to die-cast the slide fastener members on the beaded edge of a fabric stringer.

My invention is diametrically opposed to this practice in that I propose to manufacture the fastener elements with the most efficient shapes and then mold the stringer in the fastener elements. The advantages resulting from the invention will be apparent to those skilled in the art. A great deal of difficulty is experienced in manufacturing stringers with sufficiently accurate beads and then further difficulty is experienced in placing the fastener members accurately in position upon them and in keeping the dimensions of the stringer constant during each attachment. Furthermore, in the applying of the fastener elements to the beaded edge of stringers, it is difficult to keep the accurate shapes of the fastener members.

In my invention, however, the fastener members can be made accurately and the stringer molded into position will not vary in length or thickness.

In the accompanying drawing, I have shown for purposes of illustration a preferred embodiment and a few of the simpler modifications thereof.

In the drawing:

Fig. 1 is a face view of a slide fastener constructed in accordance with my invention;

Fig. 2 is a cross-section;

Fig. 3 is a cross-section showing the method of molding the stringer in position;

Fig. 4 is a cross-section showing a modified construction;

Figs. 5 and 6 are side and top views respectively of the slide fastener member shown in Fig. 4;

Fig. 7 is a cross-section showing a further modification;

Fig. 8 is a top view of the fastener member of Fig. 7; and

Fig. 9 is a cross-section showing a still further modification.

The particular form of slide fastener is not important and the one shown comprises fastener members 10, 11 having the usual projections and sockets 12 and 13 respectively, which interengage and hold the fastener together. A slider 14 moves over the fastener members in opening and closing the same. Each of the fastener elements as shown in Figs. 2 and 3 has a round hole 15 in its stringer engaging portion.

The stringer herein instead of the usual flexible fabric member is a molded stringer in which there is a round beaded portion 16 and an integral flat portion 17 extending therefrom to provide means for attachment to the side of an opening in an article in which the fastener is used. The stringer preferably consists of molded rubber and is sufficiently flexible to accommodate the necessary movements of the fastener elements when the slider is moved, and also to provide for transverse flexibility of the fastener. Preferably there is a thread or cord reinforcement 18 in the beaded portion 16 and a fabric reinforcement 19 in the flat portion 17 of the stringer. When there is no opening in the end of the fastener member, as in Figs. 2 and 3, these fabric reinforcements 19 would not extend into the beaded portion but ordinarily there will be sufficient strength in the rubber at those points.

In Fig. 4 the stringer engaging portion consists of a single arm 20 preferably having shoulders 21 to provide interengaging means with the rubber stringer member 22, and it may also have a hole 23 to provide the space in which the molded rubber may flow.

In Figs. 7 and 8 the fastener member is the same as in Figs. 2 and 3 with the exception that it opens through the end at 24 and the reinforcement 25 extends into and connects with the bead reinforcement 26. In this modification the legs of the fastener elements are never any further apart than shown in Fig. 8.

In Fig. 9 the construction is approximately the same with the exception that a square opening 28 is provided in each fastener member and there are two beaded reinforcements 29, 30 extending longitudinally of the bead.

The method of manufacture will now be readily understood. First a series of fastener members is placed in one of the mold parts 31 in properly spaced and aligned relation, and also with the reinforcing elements in position in the mold. Then the rubber is placed in position and the other mold part 32 closed against the mold part 31, whereupon the rubber stringer is compressed and vulcanized in proper position. If desirous the moldable material may be injected into the molds after they are closed. With the rubber stringer elements molded in position as shown the operation of the fastener is substantially the same as the present day fasteners except that it is believed it will be smoother because of greater accuracy of the fastener parts. The slider 14, however, rides directly on the shoulders of the fastener members. This does not have any bearing on any portion of the molded rubber element which would result in an undue amount of friction and wear.

While I have shown and described in this application one embodiment and several modifications thereof which my invention may assume in practice, it will be understood that this embodiment and the modifications are merely for the purpose of illustration and description, and that various other forms may be devised within the scope of my invention as defined in the appended claims.

Having thus fully described my invention, what I claim as new and desire to secure by Letters Patent is:

1. The method of making flexible fasteners of the class described, comprising placing a series of fastener elements in aligned and spaced relation, each of which elements has interengaging portions for cooperating with a flexible stringer, and then molding the stringer from flexible moldable material in engagement with said fastener elements whereby said fastener elements are held on said stringer when molded.

2. A method of making flexible fasteners of the class described comprising placing a series of aligned and spaced apart fastener members in a mold, said fastener members having aligned openings, and then molding a flexible stringer in said mold, portions of said flexible stringer occupying said aligned openings whereby said fastener members are firmly held on said stringer when removed from the mold.

3. In a method of making flexible fasteners of the class described, comprising placing in aligned and spaced relation a series of fastener elements completely preformed to final shape and size, each of said elements having portions interengageable with a flexible stringer, and then molding the stringer from flexible moldable material in interengagement with said last-named portions of said fastener elements whereby said fastener elements are fixed to said stringer when molded.

4. A method of making flexible fasteners of the class described, comprising placing in predetermined aligned and spaced relation in a mold a series of fastener elements completely formed to final shape and size and having stringer-receiving apertures formed therein, supplying flexible moldable material to spaces in said mold adjacent said fastener elements, and applying heat and pressure to said mold to mold said material to the form of a stringer having portions extending into said stringer-receiving apertures in said fastener elements.

5. A method of making flexible fasteners of the class described comprising placing in predetermined aligned and spaced apart relation in a mold a series of fastener members having aligned openings, suspending a stringer bead reinforcement in said aligned openings, and then molding a flexible stringer around said elements and said reinforcement, said stringer extending between said bead reinforcement and the walls of said openings in said elements.

NOEL J. POUX.